(12) United States Patent
Valeriano et al.

(10) Patent No.: US 7,844,864 B2
(45) Date of Patent: Nov. 30, 2010

(54) LOCATION BASED NOTIFICATION SYSTEM

(75) Inventors: Francisco M. Valeriano, Torrance, CA (US); Sabrina Pui-Wah Matsunaga, Oak Park, CA (US); Amos Y. Kuo, Torrance, CA (US)

(73) Assignee: Xerox Corporation, Norwalk, CT (US)

( * ) Notice: Subject to any disclaimer, the term of this patent is extended or adjusted under 35 U.S.C. 154(b) by 552 days.

(21) Appl. No.: 11/973,074

(22) Filed: Oct. 5, 2007

(65) Prior Publication Data
US 2009/0094490 A1 Apr. 9, 2009

(51) Int. Cl.
*G06F 11/00* (2006.01)
(52) U.S. Cl. .......................... 714/48; 714/47
(58) Field of Classification Search .............. 714/39, 714/57, 48, 47, 49
See application file for complete search history.

(56) References Cited

U.S. PATENT DOCUMENTS

| | | | |
|---|---|---|---|
| 7,036,048 B1 | 4/2006 | Gill et al. | 714/47 |
| 7,096,158 B2 | 8/2006 | Kitada et al. | 702/185 |
| 7,149,612 B2 * | 12/2006 | Stefani et al. | 701/35 |
| 7,178,049 B2 * | 2/2007 | Lutter | 714/1 |
| 7,202,801 B2 | 4/2007 | Chou | 340/994 |
| 2003/0114966 A1 * | 6/2003 | Ferguson et al. | 701/29 |

* cited by examiner

*Primary Examiner*—Dieu-Minh Le
(74) *Attorney, Agent, or Firm*—Alix, Yale & Ristas, LLP

(57) ABSTRACT

A location based notification system for a shop having multiple components that are susceptible to a fault event includes an electronic data storage device and a fault event sensor apparatus associated with each susceptible component. The electronic data storage device has identification data for the associated component stored therein. Operators carry a portable device having an electronic data storage device reader and a memory. The fault event sensor apparatus generates fault event data when a fault event occurs in the associated component and transmits the fault event data to the electronic data storage device or the portable device. The data stored in the electronic data storage devices is read with an electronic data storage device reader of the portable device as the operator moves through the shop. The portable device determines whether the electronic data storage device has fault data stored therein, or if fault event data has been stored in the portable device for the component associated with the identification data read from the electronic data storage device.

20 Claims, 2 Drawing Sheets

LOCATION BASED NOTIFICATION SYSTEM

BACKGROUND

This disclosure relates generally to print shop systems. More particularly, the present disclosure relates to a system for monitoring fault conditions in a print shop and for automatically notifying service personnel or other entity of conditions requiring attention.

Many types of print shop apparatus include internal systems which monitor their operation. These internal systems often operate to check the available quantities of items which are required for proper operation of the apparatus. This may include the amount of stock available in the apparatus for printing. Other systems may monitor the availability of supplies such as staples. Such systems operate to provide a signal when the quantities of such items reach levels indicative of a need for replenishment. It is also common to provide further signals regarding the operating status of the print shop apparatus.

Print shop apparatus often include systems for providing signals indicative of malfunctions or the existence of other conditions which impede the operation of the apparatus. For example, apparatus which accept completed or partially completed print jobs may reach a condition where the depository is filled and cannot accept further deposits. When this occurs the apparatus loses all or a portion of its functional capabilities.

Other malfunctions may include failures of paper transport mechanisms, optical readers, electronic readers or other components of the apparatus. In each case, upon sensing a failure condition, the apparatus is operative to generate signals indicative of the condition.

Different types of print shop apparatus generate different types of fault signals. One reason for this is that apparatus often include different components. For example, certain apparatus may function only to dispense print media such as paper, in which case no fault signals related to a depository are generated by such an apparatus. In addition, different manufactures use different types of fault signals for indicating conditions which exist in their apparatus.

The key element in fault signals or fault notifications, is the implied requirement for action. For the previous examples the actions are to add paper to the printer or to clear a jam in a paper path. In most of the cases, the action needs to be performed in a predefined location or over a predefined object.

Also in a given environment, there may be many people that can perform the action. In these cases, notifications are sent to one of the people capable of doing the action by using some predefined assignment or by using a dispatching system that allocate actions to people.

While in some situations the notification will describe a problem that needs immediate action and the notified person needs to stop whatever this person is doing and attend the problem, for most notifications that is not the case. In a typical notification, the user would acknowledge the receipt of the notification and not act upon it until later.

Conventional notification systems have several deficiencies. The person who is notified of the fault condition may be performing some other activity or may be at a remote location, thereby delaying a response to the notification. The person who is notified must be capable of handling the event that has caused the fault condition.

SUMMARY

There is provided a location based notification system for a shop having multiple components, where at least one of the components is susceptible to a fault event. The system comprises an electronic data storage device and a fault event sensor apparatus associated with the component. The electronic data storage device has identification data for the associated component stored therein. At least one operator carries a portable device having an electronic data storage device reader and a memory. The fault event sensor apparatus generates fault event data when a fault event occurs in the associated component and transmits the fault event data to the electronic data storage device or the portable device.

The location based notification system may further comprise an apparatus required to perform an action corresponding to the fault event. This apparatus includes an electronic data storage device having identification data for the apparatus stored therein.

If the fault sensor apparatus is in communication with the electronic data storage device, the electronic data storage device stores the fault event data generated by the fault event sensor. If the fault sensor apparatus is in communication with the portable device, and the portable device memory stores the fault event data generated by the fault event sensor.

The portable device memory may also include a description of the qualifications of the user carrying the portable device.

The location based notification system may further comprise a computer in communication with the component fault event sensor and the portable device, the computer receiving the fault event data generated by the component fault event sensor and transmitting the fault event data to the portable device. The computer may include a wireless transmitter and the portable device may include a wireless receiver.

There is also provided a method of providing location based notification of a fault event occurring in a component of shop having a plurality of components, with at least one of the components being susceptible to a fault event. The method comprises monitoring for the occurrence of a fault event with a fault event sensor associated with the component. Fault event data is generated when a fault event is detected by the fault event sensor. The fault event data is stored in an electronic data storage device associated with the component or a portable device carried by an operator.

If the fault event data is stored in the electronic data storage device, the data stored in the electronic data storage device is read with an electronic data storage device reader of the portable device as the operator moves through the shop. It is determined whether the electronic data storage device reader has detected fault event data stored in the electronic data storage device. If the electronic data storage device reader detects fault event data, it is determined whether the operator carrying the portable device is to be notified.

Determining whether the operator carrying the portable device is to be notified comprises determining whether the operator is qualified to correct the fault event and determining whether the operator can perform corrective measures within a predetermined period of time. If the operator carrying the portable device if the operator is qualified to correct the fault event and can correct the fault event within the predetermined period of time, the operator is notified.

If the fault event data is stored in the portable device, the fault event data and identification data for the component are transmitted from the component to a computer, which transmits the fault event data and component identification data to the portable device. The fault event data and component identification data are then stored in the portable device. The identification data stored in the electronic data storage devices are read with an electronic data storage device reader of the portable device as the operator moves through the shop. This identification data is compared to the component identification data stored in the portable device and is determined if fault event data has been stored in the portable device for the component associated with the identification data read from each electronic data storage device. If the electronic data storage device reader detects fault event data, it is determined whether the operator carrying the portable device is to be notified. If fault event data has been stored in the portable device for the component associated with the identification data read from each electronic data storage device, it is then determined whether the operator carrying the portable device is to be notified.

BRIEF DESCRIPTION OF THE DRAWINGS

The present disclosure may be better understood and its numerous objects and advantages will become apparent to those skilled in the art by reference to the accompanying drawings in which.

DETAILED DESCRIPTION

Figure 1:
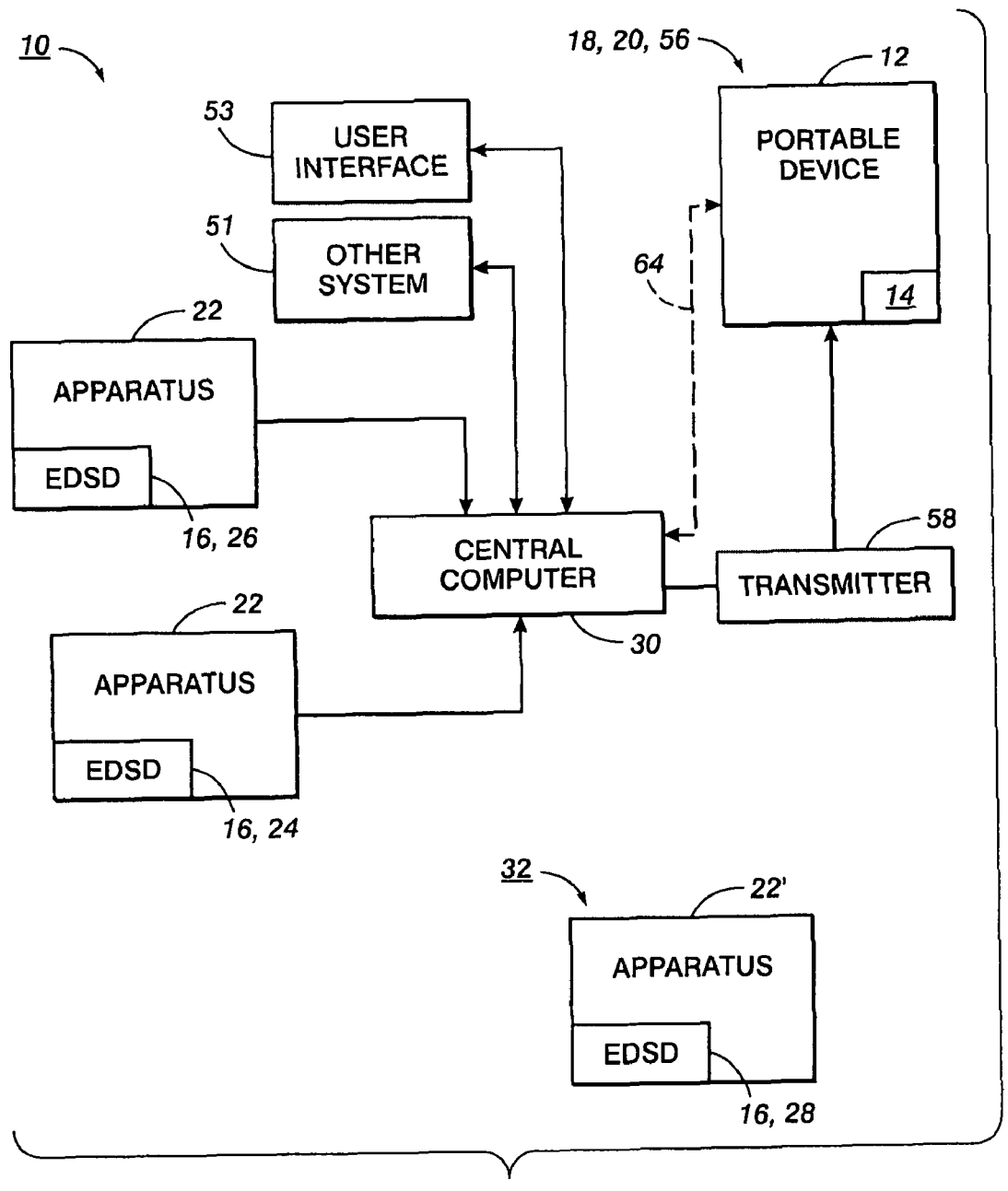
FIG. 1 is a schematic diagram of a location based notification system.
Figure 2:
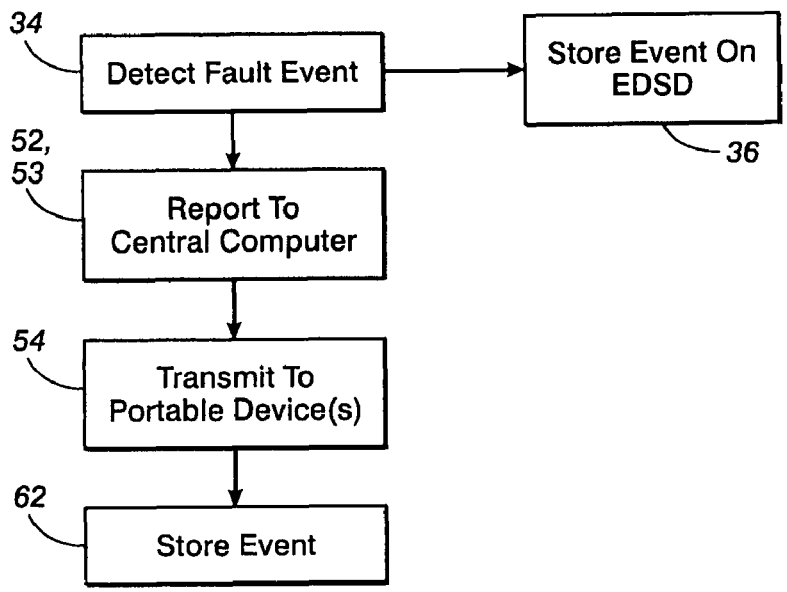
FIGS. 2 and 3 are flow diagrams of a method of operating a location based notification system.
Figure 3:
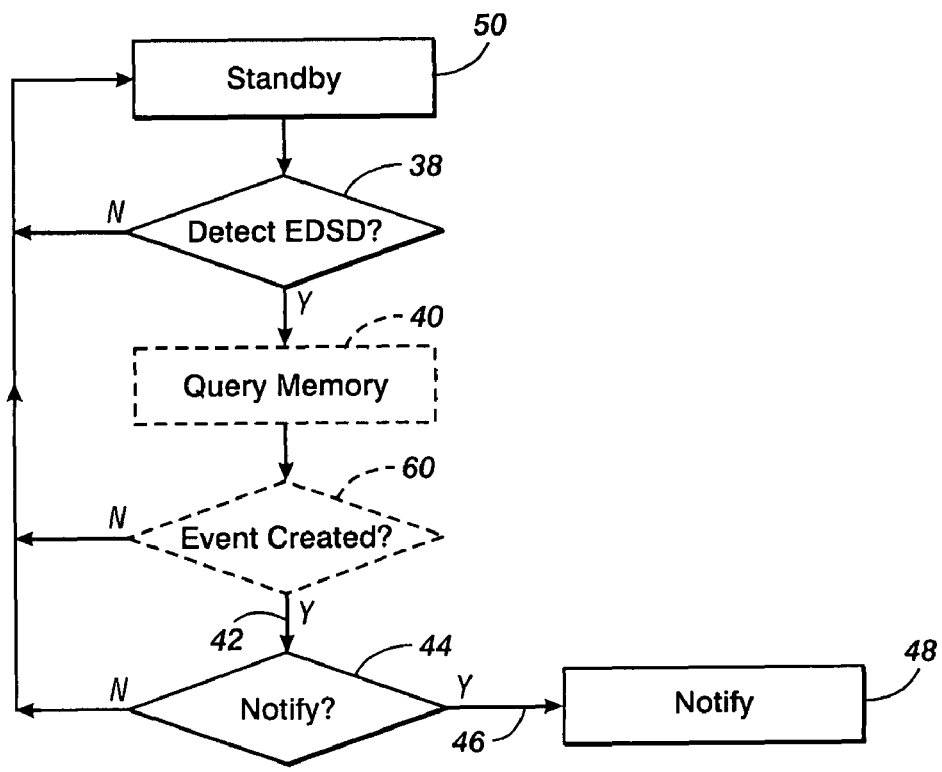

With reference to the drawings wherein like numerals represent like parts throughout the several figures, a location based notification system in accordance with the present disclosure is generally designated by the numeral 10. To facilitate the disclosure, the notification system 10 for a print shop will be described. It should be understood that the subject notification system 10 is applicable to any process having components that may experience a fault event.

In the subject location based notification system 10, each user of the notification system carries a portable device 12, for example a PDA, a cell phone, or the like, having an electronic data storage device reader 14. An "electronic data storage device" (EDSD) 16 is a machine-writeable and machine-readable device capable of storing electronic data. Electronic data storage device 16 refers to a single electronic data storage device as well as to a collection of two or more electronic data storage devices connected, for example, in series, in parallel, or nested one within another. Examples of electronic data storage devices 16 include, but are not limited to, radio frequency identification tags (EDSDs), proximity (Prox) tags, iButtons, smartcards, and similar devices. It should be appreciated that the effective operating range for the EDSD reader 14 to detect and read the EDSD 16 is dependent on the type of EDSD 16 and EDSD reader 14. For example, an active EDSD 16 may be detected and read at a greater distance than an inactive EDSD 16.

The portable device 12 also includes a program or database 18 storing a description 20 of the role (e.g. copier operator, binding apparatus operator, etc.) of the user carrying the device 12. This information 20 is initially stored when the user configures the portable device 12, but may be changed based a change in the role of the user, a change in the shift of the user, the activities the user is performing, etc.

Each fault event in the notification system 10 is associated with at least one specific apparatus 22, 22'. Generally, such apparatus 22, 22' includes the apparatus experiencing the fault event, in some cases the fault event will also be associated with an apparatus 22, 22' that is required to perform an action corresponding to the fault event. Accordingly, each apparatus 22, 22' that may experience a fault event or that may be required to perform an action corresponding to a fault event has an EDSD 16 attached/mounted to it in a manner that allows the data 24 stored in the EDSD 16 to be detected and read by the EDSD reader 14 in the user's portable device 12. The EDSD 16 has identification information 26 for the apparatus, and other data 28 as described below, stored therein.

It is common for print shops to have some apparatus 22 that is monitored and/or controlled by a central computer 30 and some apparatus 22' that is neither monitored nor controlled by a central computer 30. The subject notification system 10 provides a method of notifying the appropriate users of a fault event in each apparatus 22, 22' of the print shop, whether or not it is connected to a central computer 30. This flexibility may also be used to provide redundant notification of fault events in certain critical print shop apparatus 22, 22', or alternatively, for all print shop apparatus 22, 22'.

Distributed event notification includes the equipment and method of providing fault event notification at the location of the apparatus 22, 22' experiencing the fault event, or the apparatus 22, 22' required to perform an action corresponding to the fault event. Distributed event notification is particularly useful for print shop apparatus 22' that is not monitored and/or controlled by a central computer 30. In this embodiment, the EDSD 16 mounted to the apparatus is also in communication with the sensors or electronic systems 32 that detect the occurrence of a fault event. Once these sensors detect 34 the fault event has occurred, the sensor/electronic system 32 records 36 the fault event data 28 in the memory of the EDSD 16. As a user moves about the print shop, whereby such an EDSD 16 comes within the range of the EDSD reader 14 of their portable device 12, the EDSD reader 14 will detect 38 the EDSD 16, the software 18 in the portable device 12 will read 40 the data 24 stored in the memory of the EDSD 16.

If fault event data 28 is stored 42 in the EDSD 16, the portable device software 18 verifies 44 if the fault event should be presented to the user as a notification or not. This verification is based on the description 20 of the role of the user carrying the device 12 and the activities this user may be carrying on. The implementation of this verification could be as simple as a table lookup or it could be a more complex algorithm based on priorities. Regardless of the implementation, the goal of the software 18 is that the notification is only presented when the user can and will act on the event expeditiously. If the portable device software 18 determines that its user should receive notification 46 of the fault event, the portable device 12 provides 48 such notification. If not so, the portable device 12 returns to standby 50.

It should be appreciated that while notification of the fault event will not occur until the user and the faulted apparatus are within the effective range of the EDSD reader 14, such notification will occur whether or not the user has any intention of using that apparatus 22' and does not require that the user come within line-of-sight of the apparatus 22'. In a conventional print shop, fault notification generally would not occur until a user intending to use the faulted apparatus 22' discovered that the apparatus 22' was faulted.

In central event notification, a central computer 30 is in communication with other print shop apparatus 22, and receives 52 fault event reports from this apparatus 22 when such fault events occur. The central computer 30 may also receive periodic reports, such as status reports, reports of print job completion, etc., communications from other systems 51, such as maintenance database systems, and communications from users via a user interface 53. When a fault event occurs, the apparatus 22 transmits 53 a fault event report and identification data 26 for the apparatus 22 to the central computer 30. The central computer 30 transmits 54 the fault event report to the portable device 12 of each user of the notification system. This fault event report 56 is stored 62 in the portable device memory. Depending on the capabilities of the portable devices 12, this communication can happen at real time over a wireless transmitter 58 or it may happen when the portable device 12 is synchronized 64 via a physical connection.

As each user moves about the print shop, the EDSD reader 14 of their portable device will detect 38 and read 40 the identification data 26 stored in the EDSD 16 of each apparatus 22 that comes within range of the EDSD reader 14. The portable device 12 then queries 60 its own memory to determine if a fault event 56 has been stored for the apparatus 22 belonging to the identifier 26. As in the case of distributed event notification, the portable device software 18 verifies 44 if the stored fault event should be presented to the user as a notification or not. If the portable device software determines that its user should receive notification 46 of the fault event, the portable device 12 provides 48 such notification.

In a typical print shop, where some of the print shop apparatus 22' is not in communication with a central computer 30, the notification system 10 may include both distributed event notification and central event notification. In this case, the apparatus 22 that is in communication with the central computer 30 will be subject to central event notification and the apparatus 22' that is not in communication with the central computer 30 will be subject to distributed event notification. In this manner, each piece of print shop apparatus 22, 22' will be covered by the notification system 10.

If redundant notification of fault events is desired, for critical print shop apparatus for example, such print shop apparatus 22 will be subject to both central event notification and distributed event notification. In this case, the fault event will be reported 53 to the central computer 30 and then distributed 54 to the portable devices 12 of the users, as described above, and stored 36 in the EDSD 16 of the apparatus 22, as also described above. It should be appreciated that such redundant notification may be extended to each piece of print shop apparatus 22 that is in communication with the central computer.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A location based notification system for a shop having a plurality of components, at least one of the components being susceptible to a fault event, the system comprising:
an electronic data storage device associated with the component that is susceptible to a fault event, the electronic data storage device having data stored therein, the stored data including identification data for the associated component;
at least one portable device carried by an operator, the portable device including
an electronic data storage device reader, and
a memory; and
fault event sensor apparatus associated with the component that is susceptible to a fault event, the fault event sensor apparatus generating fault event data when a fault event occurs in the associated component, the fault event sensor apparatus being in communication with the electronic data storage device or the portable device.

2. The location based notification system of claim 1 further comprising an apparatus required to perform an action corresponding to the fault event, the apparatus including an electronic data storage device having identification data for the apparatus stored therein.

3. The location based notification system of claim 1 wherein the fault sensor apparatus is in communication with the electronic data storage device, and the data stored in the electronic data storage device also includes the fault event data generated by the fault event sensor.

4. The location based notification system of claim 1 wherein the fault sensor apparatus is in communication with the portable device, and the data stored in the portable device memory also includes the fault event data generated by the fault event sensor.

5. The location based notification system of claim 4 wherein the portable device memory also includes a description of the user carrying the portable device.

6. The location based notification system of claim 4 further comprising a computer in communication with the component fault event sensor and the portable device, the computer receiving the fault event data generated by the component fault event sensor and transmitting the fault event data to the portable device.

7. The location based notification system of claim 6 wherein the computer includes a wireless transmitter and the portable device includes a wireless receiver.

8. The location based notification system of claim 6 further comprising another system in communications with the computer.

9. A method of providing location based notification of a fault event occurring in a component of shop, the shop having a plurality of components, with at least one of the components being susceptible to a fault event, the method comprising:
monitoring for the occurrence of a fault event with a fault event sensor associated with the component;
generating fault event data when a fault event is detected by the fault event sensor;
storing the fault event data in an electronic data storage device associated with the component;
reading the data stored in the electronic data storage device with an electronic data storage device reader of the portable device; and
determining whether the electronic data storage device reader has detected fault event data stored in the electronic data storage device, and
monitoring for the occurrence of a fault event if the electronic data storage device reader has not detected fault event data, or
determining whether the operator carrying the portable device is to be notified if the electronic data storage device reader has detected fault event data.

10. The method of claim 9 wherein determining whether the operator carrying the portable device is to be notified comprises determining whether the operator is qualified to correct the fault event.

11. The method of claim 10 wherein determining whether the operator carrying the portable device is to be notified comprises determining whether the operator carrying the portable device can perform corrective measures within a predetermined period of time.

12. The method of claim 11 further comprising notifying the operator carrying the portable device if the operator is qualified to correct the fault event and can correct the fault event within the predetermined period of time.

13. A method of providing location based notification of a fault event occurring in a component of shop, the shop having a plurality of components, with at least one of the components being susceptible to a fault event, each component that is susceptible to a fault event having an electronic data storage device having identification data for the component stored therein, the method comprising:
monitoring for the occurrence of a fault event with a fault event sensor associated with the component;
generating fault event data when a fault event is detected by the fault event sensor;
storing the fault event data in an electronic data storage device associated with the component and a portable device carried by an operator;
reading the identification data stored in the electronic data storage devices with an electronic data storage device reader of the portable device as the operator moves through the shop;
comparing the identification data read from the electronic data storage devices to the component identification data stored in the portable device; and
determining if fault event data has been stored in the portable device for the component associated with the identification data read from the electronic data storage device, and
monitoring for another electronic data storage device if no fault event data for the associated component has been stored in the portable device, or
determining whether the operator carrying the portable device is to be notified if fault event data has been stored for the associated component.

14. The method of claim 13 wherein determining whether the operator carrying the portable device is to be notified comprises determining whether the operator is qualified to correct the fault event.

15. The method of claim 14 wherein determining whether the operator carrying the portable device is to be notified comprises determining whether the operator carrying the portable device can perform corrective measures within a predetermined period of time.

16. The method of claim 15 further comprising notifying the operator carrying the portable device if the operator is qualified to correct the fault event and can correct the fault event within the predetermined period of time.

17. The method of claim 13 wherein storing the fault event data in the portable device comprises:

transmitting the fault event data and identification data for the component from the component to a computer;
transmitting the fault event data and component identification data from the computer to the portable device; and
storing the fault event data and component identification data in the portable device.

18. A method of providing location based notification of a fault event occurring in a component of shop, the shop having a plurality of components, with at least one of the components being susceptible to a fault event, each component that is susceptible to a fault event including an electronic data storage device having identification data for the component stored therein, the method comprising:
monitoring for the occurrence of a fault event with a fault event sensor associated with the component;
generating fault event data when a fault event is detected by the fault event sensor; and
storing the fault event data in the electronic data storage device, or
storing the fault event data and the identification data for the component in a portable device carried by an operator.

19. The method of claim 18 further comprising:
reading the data stored in the electronic data storage device with an electronic data storage device reader of the portable device as the operator moves through the shop; and
determining whether the electronic data storage device reader has detected fault event data stored in the electronic data storage device; or
comparing the identification data read from the electronic data storage devices to the component identification data stored in the portable device; and
determining if fault event data has been stored in the portable device for the component associated with the identification data read from the electronic data storage device.

20. The method of claim 19 wherein if the electronic data storage device reader has detected fault event data stored in the electronic data storage device, or if it has been determined that fault event data has been stored in the portable device for the associated component, the method further comprises:
determining whether the operator is qualified to correct the fault event;
determining whether the operator can perform corrective measures within a predetermined period of time; and
notifying the operator if the operator is qualified to correct the fault event and can correct the fault event within the predetermined period of time.

* * * * *